United States Patent
Brehm et al.

(10) Patent No.: US 10,304,025 B2
(45) Date of Patent: May 28, 2019

(54) CONTROLLING INDUSTRIAL TRUCKS IN A WAREHOUSE

(71) Applicant: Locanis AG, Berlin (DE)

(72) Inventors: Daniel Brehm, Munich (DE); Özgür Kurt, Dikili Izmir (TR); Anton Savchenko, Munich (DE)

(73) Assignee: Locanis AG, Berlin (DE)

( * ) Notice: Subject to any disclaimer, the term of this patent is extended or adjusted under 35 U.S.C. 154(b) by 172 days.

(21) Appl. No.: 14/721,850

(22) Filed: May 26, 2015

(65) Prior Publication Data

US 2016/0350701 A1 Dec. 1, 2016

(51) Int. Cl.
*G06Q 10/08* (2012.01)
*G05D 1/02* (2006.01)

(52) U.S. Cl.
CPC ......... *G06Q 10/083* (2013.01); *G05D 1/0287* (2013.01)

(58) Field of Classification Search
CPC .. G06Q 10/06; G06Q 10/06311; G06Q 40/04; B61L 27/00
USPC .......... 705/28, 7.21, 336; 340/988; 235/384, 235/385; 700/228
See application file for complete search history.

(56) References Cited

U.S. PATENT DOCUMENTS

| | | | | |
|---|---|---|---|---|
| 6,564,906 B1 * | 5/2003 | Haack | ....................... | B66F 9/06 187/222 |
| 6,732,045 B1 | 5/2004 | Irmer | | |
| 7,398,232 B2 * | 7/2008 | Renz | ....................... | G06Q 10/06 705/28 |
| 8,055,554 B2 * | 11/2011 | Zakula, Sr. | ............. | B66C 13/46 212/276 |
| 9,008,828 B2 * | 4/2015 | Worsley | ............... | G06Q 10/087 700/213 |
| 2002/0019759 A1 * | 2/2002 | Arunapuram | .......... | G06Q 10/04 705/7.26 |
| 2003/0125972 A1 * | 7/2003 | Luce | ....................... | G06Q 10/06 709/201 |
| 2003/0154156 A1 * | 8/2003 | Lee | ....................... | G06Q 10/087 705/37 |
| 2005/0171835 A1 * | 8/2005 | Mook | ................ | G06Q 10/0833 705/333 |
| 2005/0232747 A1 * | 10/2005 | Brackmann | ............... | B60P 3/14 414/803 |
| 2006/0136354 A1 * | 6/2006 | Bell | .................. | G06F 17/30592 |
| 2007/0233304 A1 * | 10/2007 | Baginski | ............... | B66F 9/0755 700/115 |

(Continued)

FOREIGN PATENT DOCUMENTS

EP 1 916 594 A2 4/2008

*Primary Examiner* — Vanel Frenel
(74) *Attorney, Agent, or Firm* — SoCal IP Law Group LLP; Mark Andrew Goldstein

(57) ABSTRACT

Methods, servers and computer program products for managing transport orders. The server receives a transport order which specifies a shipment to be transported from a first site to a second site. The server receives an indication of an available industrial truck of the plurality of industrial trucks. The server generates a driving order according to given criteria depending at least on properties of the available industrial truck, wherein the driving order specifies a subset of the shipment within a load capacity of the available industrial truck. The server transmits the generated driving order to the available industrial truck for execution.

18 Claims, 9 Drawing Sheets

(56) References Cited

U.S. PATENT DOCUMENTS

| | | | |
|---|---|---|---|
| 2009/0030770 A1* | 1/2009 | Hersh | G06Q 10/06311 |
| | | | 705/7.13 |
| 2011/0153470 A1* | 6/2011 | Miller | B61L 27/00 |
| | | | 705/28 |
| 2013/0211870 A1* | 8/2013 | Lawson | G06Q 10/06315 |
| | | | 705/7.25 |
| 2014/0337086 A1* | 11/2014 | Asenjo | G06Q 10/0635 |
| | | | 705/7.28 |
| 2014/0365258 A1* | 12/2014 | Vestal | G06Q 10/063114 |
| | | | 705/7.15 |
| 2015/0006428 A1* | 1/2015 | Miller | G06Q 10/0835 |
| | | | 705/336 |
| 2016/0358129 A1* | 12/2016 | Walton | G06Q 10/20 |

* cited by examiner

CONTROLLING INDUSTRIAL TRUCKS IN A WAREHOUSE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The invention generally relates to computers and server software, and in particular to methods, servers, and computer program products for controlling industrial trucks in a warehouse.

Description of the Related Art

Warehouse logistics relates to an efficient management of storage resources in a warehouse. Items are stored and retrieved by material-handling equipment, such as industrial trucks. Warehouse management systems monitor and control the state of the warehouse as well as its dynamics, including the dynamics of items and of material-handling equipment. The systems may monitor the positions and states of industrial trucks and may dispatch the industrial trucks in real-time. Warehouse management systems may typically be connected to an Enterprise Resource Management (ERP) system.

The technical performance of a warehouse may be quantified by performance measures, including response time, access time, item flow rate, load throughput, workload per space, per staff or per industrial truck. Warehouse management systems may increase the performance of the warehouse. Computer technology is increasingly used in this respect. For this reason, a continuing need exists in the art for improved computer based warehouse management systems, as well as improved servers, methods and computer program products, for controlling a plurality of industrial trucks in warehouses.

SUMMARY

Embodiments of the invention generally comprise methods, servers, and computer program products for controlling industrial trucks in a warehouse. A transport order, which specifies a shipment to be transported from a first site to a second site, may be received by a server. An indication of an available industrial truck of the plurality of industrial trucks may be received by the server. A driving order may be generated by the server according to given criteria depending at least on properties of the available industrial truck, wherein the driving order may specify a subset of the shipment within a load capacity of the available industrial truck. The generated driving order may be transmitted by the server to the available industrial truck for execution.

THE DRAWINGS

The accompanying drawings, which are incorporated in and constitute a part of this specification, illustrate various embodiments and, together with a general description of the invention given above and the detailed description of the embodiments given below, serve to explain the embodiments.

DETAILED DESCRIPTION

Figure 1:
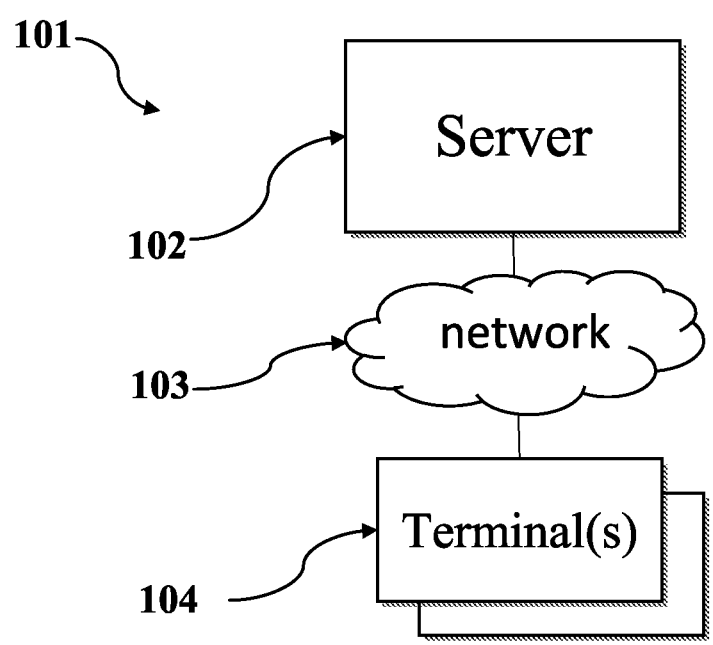
FIG. 1 is a block diagram of one server and multiple terminals used to implement the methods and systems of controlling industrial trucks in a warehouse described herein.

Embodiments described herein provide servers, methods, and computer program products for controlling a plurality of industrial trucks in a warehouse. The term "warehouse" as used herein denotes a complex for stocking goods in which a fleet (i.e., a plurality of) industrial trucks is operated to transport incoming and outgoing goods. Depending on the type, the warehouse generally includes a plurality of sites. For example, a warehouse being attached to a production entity such as a factory may include a production line where products manufactured by the factory have to be picked up by the industrial trucks, a stocking area for stocking the manufactured products and truck loading dock for loading trucks ship the manufactured goods. Consistent with some embodiments, the plurality of industrial trucks operating within the warehouse may comprise forklift trucks, pallet jacks, automated guided vehicles, or cranes.

A server may receive a transport order. In general, the transport order specifies a shipment to be transported from a first site to a second site of the warehouse such as a load of a truck having been arrived at the truck area of the warehouse, the load has to be unloaded from the truck and to be placed into the stocking area of the warehouse. Consistent with some embodiments, the server may receive a transport order by receiving a shipping order from an external system being coupled to the server such as an ERP and generating the transport order on the basis of the received shipment order. Thus, "receiving a transport order" used herein also includes reception of a shipping order by the server and translating the shipping order into a transport order.

In general, any number of transport orders may be pending at the server, i.e., the received transport order forms one of potentially a plurality of pending transport orders. The plurality of transport order may be managed by the server by maintaining the transport orders in a database.

For example, the first site may be a production line, a stocking area, a storage facility, a distribution center, a loading station, a container, truck loading dock, a truck, a boxcar, a CEP (Courier, Express, Parcel) service, a cross dock, a port, a container port, or a staging area. Consistent with some embodiments, the second site may be identical to the first site. Alternatively, the second site may be different from the first site and may be one of the above.

The server may receive an indication of an available industrial truck of the plurality of industrial trucks. The indication indicates to the server that the available industrial truck has become idle and is thus available for executing a driving order. For instance, the indication may originate from the available industrial truck. Alternatively, the indication may be sent by a computer system monitoring the plurality of industrial trucks operating within the warehouse. For instance, the indication may be sent by a computer system monitoring the locations of industrial trucks within the warehouse.

In response to receipt of the indication, the server may generate a driving order according to given criteria. In general, the generated driving order may specify a cargo to be driven from a first location within the first site of the warehouse to a second location within the second site of the warehouse. For example, the cargo may have to be transported from a particular pick-up location of the production line (in the case that the warehouse is attached to a factory) to a particular location within the stocking area. The given criteria for generating the driving order depend at least on properties of the available industrial truck. In general, the driving order specifies a subset of the shipment within a load capacity of the available industrial truck. Consistent with some embodiments, the given criteria may comprise at least one of filtering criteria and sorting criteria.

The filtering criteria are utilized for discarding transport orders of the plurality of transport orders which are unsuitable for generating the driving order to be assigned to the available industrial truck, for example, because the goods specified by the transport order cannot be transported by the industrial truck. For example, the filtering criteria may depend on capabilities of an operator of the available industrial truck, properties of the subset of the shipment, or properties of at least one of the first site and the second site. In particular, the filtering criteria may depend on a size of the available industrial truck, the load capacity of the industrial truck, an experience level of the operator of the available industrial truck, a type of a transport unit comprised by the subset of the shipment, a pallet format, a type of transport task (loading, unloading, supplying) or a loading pattern. The size of the available industrial truck may be used to exclude transport orders with spatial restrictions, such as maneuvering in narrow aisles of the stocking area. The load capacity of the industrial truck may be used to exclude transport orders relating to goods being too bulky for the available industrial truck. The experience level of the operator may be used to exclude transport orders with unusual tasks (e.g., handling non-standard pallets), high levels of difficulty, hazardous goods or fragile material. The type of transport unit or pallet format may be used to exclude transport orders for particular operators or industrial trucks, which cannot deal with an unusual pallet format. The type of transport task includes general purpose task such as loading, unloading, or supplying. A loading pattern may refer to a spatial configuration of multiple pallets of a certain type or format on a particular type of industrial truck. For instance, depending on the industrial truck type, 6 pallets may be arranged in a wide 2-by-3 configuration or a high 3-by-2 configuration. These example filter criteria highlight the possibility of inter-dependent filter criteria: For instance, a rule set may be created, which depends on both operator experience and transport unit type, e.g., "inexperienced operator can only deal with euro pallets". Other example rule sets may include: "inexperienced operator can drive a big forklift", "inexperienced operator cannot drive into shelf zone", "big forklift carries euro pallets as wide 2-by-3 pattern", "small forklift cannot load trucks", "big forklift cannot drive into shelf zone". In general, the permutations and inter-dependencies between these families of filter criteria are not restricted.

The sorting criteria are utilized for prioritizing the transport orders in order to determine the most critical transport order based on which the driving order to be assigned to the available industrial truck should be generated. For example, sorting criteria may depend on a priority of the transport order, an age of the transport order, a utilization rate of the available industrial truck, a utilization rate of the plurality of industrial trucks and/or the location of the available industrial truck in relation to the current location of the shipment specified by the respective transport order.

After having determined to most prioritized transport order in accordance with the filtering criteria (and corresponding filtering rules) and the sorting criteria, the server may generate the driving order specifying a portion or subset of the shipment specified by the most prioritized transport order being within the capabilities/capacities of the available truck. Thus, the driving order specifies a maximum of goods which the available industrial truck can transport in a single run from the first site to the second site of the warehouse. Consistent with some embodiments, the driving order is generated on the basis of one or more databases containing information concerning the plurality of industrial trucks, operators of the plurality of industrial trucks, the sites of the warehouse, and/or the pending transport orders with the associated shipment/goods.

The server may transmit the generated driving order to the available industrial truck for execution. In response to receipt of the driving order, the available industrial truck may execute the driving order by picking up the cargo specified by the driving order at the first location within the first site (the current location, i.e., the source of the cargo) and transporting the cargo to the second location within the second site (the destination of the cargo).

Consistent with some embodiments, after having generated the driving order, the server may update the transport order which formed the basis of the driving order (i.e., the most prioritized transport order as outlined above) in the respective database by subtracting the subset of the shipment specified by the generated driving order from the shipment to be transported resulting in an updated transport order. Thus, the updated transport order maintained in the database reflects the remaining shipment/goods without the subset of the shipment specified by the generated driving order which is currently being transported by the available industrial truck.

Furthermore, after having been assigned with the driving order by successful signaling the driving order by the server to the available industrial truck, the industrial truck may acknowledge successful receipt of the driving order and the server may flag the available industrial truck to be unavailable again in the respective database.

At a later point, the server may, consistent with some embodiments, receive a further indication of another available industrial truck or the same available industrial truck of the plurality of industrial trucks. Again, the further indication indicates to the server that the other industrial truck or the same industrial truck has become idle, e.g., after having completed the execution of a previous driving order. In response of receipt of the further indication, the server may generate a further driving order according to the given criteria as explained above. In general, the criteria depend at least on properties of the other available industrial truck or the same available industrial truck. Assuming that application of the filter criteria and the sorting criteria leads to the same transport order as the most prioritized transport order (i.e., the updated transport order, being one of the potential plurality of transport orders pending at the server), the server generates a further driving order specifies a further subset of the shipment specified by the updated transport order which is within a load capacity of the other or the same available industrial truck. The server may transmit the generated further driving order to the other or the same available industrial truck for execution. The server may then update the updated transport order by excluding the further subset of the shipment specified by the further generated driving order from the shipment specified by the updated transport order.

Further consistent with some embodiments, the server may receive still a further indication, generate still a further driving order, transmit the still further driving order, and update the updated transport order repeatedly until the updated transport order is void, i.e., the transport order has been processed completely and the complete shipment specified by the transport order is transported from the first site to the second site. The server may then delete the void transport order. Of course, depending on the filter criteria and the sorting criteria, the transport orders pending at the server may be processed in an interleaved manner, i.e., depending on the properties of the respective available industrial truck and current characteristics of the pending transport orders, other than the above exemplary transport order (which was referred to as being "most prioritized") may be selected to form the basis for generating the respective driving order and, accordingly, the driving order may then specify a subset of the shipment of this (other) transport order.

Consistent with some embodiments, the server may receive a driving order completion report or an error message from the available industrial truck after having successfully completed the driving order and aborted the driving order due to an error (such as a failure of the industrial truck), respectively.

Consistent with some embodiments, the server may receive a localization signal from the available industrial truck, determine the localization of the available industrial truck, send a navigation signal to the available industrial truck, and/or monitor the available industrial truck carrying out the driving order.

The following exemplary comparison based on specific figures shall highlight the differences between a state-of-the-art method for controlling industrial trucks in a warehouse and applicant's method for controlling industrial trucks as disclosed herein. Considering the example of a beverage production site with an outgoing distribution warehouse, the general tasks are to move produced beverage kegs and bottles, readily arranged on pallets, into the warehouse stocking area and to move the stored pallets into delivery trucks, which may then deliver the beverage shipments from the warehouse loading dock to a regional distribution center or directly to a vendor. In addition, incoming trucks may carry empty bottles, which shall be delivered to the production site for further use and filling. Each shipment consists of several pallets, i.e., multiple pieces of cargo. Shipment origin and destination sites (i.e., the first site and the second site of the warehouse as introduced above) in the present example include: the production line, the stocking area, and the truck loading dock.

For simplicity, we assume that the production runs continuously and produces a steady stream pallets of orange juice and pallets of apple juice. These pallets enter the warehouse stocking area at a single point of entry, namely the production output. They are to be stored in two different stocking areas of the warehouse, one for orange juice and another for apple juice. The warehouse is operated by a fleet of three forklift trucks (numbers one, two and three). At the beginning of a warehouse operation shift, e.g., at 7 a.m., three forklift operators report for duty, start up their forklift terminals, log into the system and indicate their availability for driving orders. Thus, the server receives three indications from the three forklift trucks at substantially the same time. The only transport orders at this time are to store the current production (i.e., a given number of goods waiting in the production line) in the warehouse stocking area. Currently, a significant amount of orange juice may already be on stock and production thus only produces pallets of apple juice. Assuming that one forklift can transport two pallets, in accordance with the present embodiments, all forklifts will be assigned with respective driving orders based on this single pending transport order to move the current production output (a given number of pallets with apple juice being located at the production line) into the respective warehouse stocking area (apple juice area).

For example, at 7:15 a.m., a first empty delivery truck arrives at the truck loading dock of the warehouse. Thus, a new transport order is generated by the server, which requires six pallets of orange juice to be loaded into the truck. Traditionally, in state-of-the-art methods, one of the three forklifts would be assigned to conduct this transport order, requiring three runs at two pallets per run. Returning to the orange juice storage area for picking up orange juice pallets to be loaded would be an empty run. The details of how to execute the transport order of loading the truck with the six orange juice pallets would not be specified to the forklift operator. The remaining forklift would stay with their previous job of storing the produced apple juice pallets from the production line to the stocking area.

According to the present embodiments, however, the transport order to load the truck is not assigned to a single forklift. Rather, upon forklift availability (i.e., reception of a respective indication), the server may generate a single driving order to be transmitted to the forklift from the pool of remaining transport orders, i.e., the first transport order to move the apple juice pallets from the production line to the stocking area and the second transport order to load the truck with the six pallets of orange juice. To generate a driving order, the server may filter the list of transport orders by removing those transport orders which cannot be fulfilled by the available forklift or its operator. Finally, priorities are determined and assigned for each of the transport orders and a single driving order, preferably a subset of the most highly ranked transport order according to the assigned priorities, is transmitted to the available forklift. In the present case, the server—after having received an indication that forklift number two has become idle after having moved two apple juice pallets from the production line to the stocking area of the warehouse—determines that the second transport order dedicated to loading the truck is more urgent than the first transport order to move the produced apple juice from the production line to the stocking area and, thus, the available forklift number two may be dispatched to the task of picking up two orange juice pallets (corresponding to the maximum load of forklift number two) from a specific address in the orange juice storage area and to drive this cargo to the truck to be loaded, thereby completing its current specific task, the driving order. This is in contrast to state-of-the-art methods, wherein the forklift's task would not have been completed yet, since his task consists in loading the entire truck (i.e., transporting all six orange juice pallets as opposed to only transporting two orange juice pallets).

As a next event, forklift number three may indicate its availability to the server after having moved two apple juice pallets from the production line to the stocking area. Again, in accordance with the present embodiments, the server will perform the process of generating a driving order (including the filtering and sorting the pending transport orders by the server) de novo. Thus, the server may again determine the second transport order to load the truck with the remaining four orange juice pallets (as the first two of the original six orange juice pallets are currently already transported by forklift number two) as the most prioritized transport order and, thus, generate a driving order to move two orange juice pallets from the stocking area to the truck.

Returning to the forklift number two having completed its driving order by loading the first two orange juice pallets into the truck, this forklift again indicates its availability to the server upon completion of this driving order. The process of generating a driving order (including the filtering and sorting the pending transport orders by the server) is carried out de novo in accordance with the present embodiments.

Continuing the example, and given that the forklift number two is now located at the truck loading dock, the outcome of driving order generation may be different than before, at another location. For instance, picking up another two pallets from the orange juice storage area may require a long empty run from the loading dock to the orange juice storage area. An "avoid-empty-runs" or "maximize-utilization-rate" priority criterion of the server may de-prioritize the second transport order to load the truck with the remaining two orange juice pallets. Instead, moving newly produced pallets from the production output may be advantageous, assuming a shorter distance drive from the truck loading dock to the production output than back to the stocking area. Thus, the forklift number tow which was until now involved in loading the truck is assigned a different task, namely the driving order of storing two apple juice pallets from the production output to the stocking area.

The process of driving order generation by filtering and sorting transport orders is carried out for each forklift whenever a forklift signals its availability upon completion of a previous driving order (or beginning of a shift), thereby possibly switching back and forth the forklifts between different transport orders.

At 8 a.m., a fleet of multiple trucks arrives at the loading bay, all of them await to be loaded. The three forklifts may now be assigned with various driving orders as the loading of the trucks progresses. At the same time, production continues to produce pallets of apple juice and a new transport order to move further apple juice pallets from the production line to the stocking area is sent to the server (e.g., from the ERP of the beverage factory). This situation bears the risk of pallets "piling up" at the production output. The present server-implemented method intrinsically is able to reduce this risk of pallet accumulation at the production output by assigning a higher base priority to production-related transport orders.

A similar situation would occur, if another production line is started up and both apple juice pallets and orange juice pallets are produced concurrently thereby increasing production output and need for material-handling equipment to store the produced cargo.

Also, the arrival of a high-priority truck may temporarily suppress the generation and assignment of driving orders relating to pending, yet unfinished, older transport orders. However, by default, if no other priority criteria apply, driving orders relating to older transport orders may be generated and assigned primarily.

State-of-the-art methods are not capable of this fine-grained prioritization since they act on the level of the more complex transport orders, rather than on the level of individual driving orders (the latter ones not exceeding the transport capabilities of an industrial truck for a single run). For instance, returning to the example of concurrently loading two delivery trucks (e.g., with twelve pallets each), i.e., two respective transport orders, and discharging production output by employing the three forklifts operating the warehouse, i.e., a third transport order, a state-of-the-art method would assign forklift number one to load the first truck, forklift number two to load the second truck and forklift number three to move the production output to the stocking area. Assuming a load capacity of two pallets per forklift per run, and a run time of 90 seconds from the stocking area to the delivery trucks (and 90 seconds for returning), the execution of the first transport order (i.e., loading the first truck) would require 18 minutes. 50% of run time (namely returning to the storage area) would be empty runs. The same is true for the second transport order, i.e., loading the second truck. Assuming a run time of 30 seconds from the production to the stocking area (and another 30 seconds for the way back), a total of 36 pallets would be discharged from the production output and stored in the storage area by the single remaining forklift in the meantime (i.e., two pallets per minute amounting to 36 pallets within the 18 minutes). Forklift number three assigned to the production output would also have a utilization rate of 50%.

By comparison, in the same circumstances, the method according to the present disclosure is able to yield a substantial increase in throughput and decrease of empty runs. All three forklifts receive driving orders from all three transport orders. For instance, assuming that the three forklifts are initially located at the production output, then all of them receive a driving order of storing two pallets (30 seconds). Having completed these three driving orders, all three forklifts are then located at the stocking area, where they may be assigned with driving orders of transporting pallets to the two delivery trucks (first and second transport orders, 90 seconds). At the truck loading dock, they may be ordered to return to the production output (e.g., 80 seconds of empty drive) and store produced pallets, i.e., re-starting the same cycle. For loading both trucks with 12 pallets per truck, the three forklifts would require less than 14 minutes (800 seconds) as opposed to the 18 minutes above. In the meantime (i.e., within these 800 seconds), they will also have stored 24 pallets from the production output into the stocking area. The overall utilization rate during this time amounts to 60%. Moreover, after a total of 18 minutes (for the sake of comparison with the state-of-the-art method), the total of stored pallets from the production output amounts to 54 pallets (24 pallets interleaved to processing the two transport orders specifying the truck loading within the first 800 seconds, and further 30 pallets of dedicated production storage after completion of truck loading within the remaining 280 seconds), compared to 36 pallets moved in accordance with the state-of-the-art method. This (rather simplified) example highlights the potential of increase in both efficiency and throughput, as well as overall utilization rate, in the method according to the present disclosure as compared to a state-of-the-art method.

The process of generating a driving order to be carried out depends on the forklift requesting the driving order. Assuming that a smaller pallet jack joins the team at 8:30 a.m., which cannot carry two pallets of any size but only one regular-sized pallet, the filtered list of transport orders for this particular pallet jack will only include transport orders relating to a transport of single regular pallets. A transport order containing both feasible and non-feasible tasks (for a particular forklift or pallet jack) may be partially completed by this equipment. As an illustration, one can assume, that a delivery truck demands to be loaded with 10 regular pallets (e.g., EUR1) and 10 larger-sized pallets (e.g., EUR2 or industrial pallet). If the next available equipment is the small pallet jack (equipped for a single regular pallet), this small pallet jack can contribute to the transport order by receiving and completing one or more driving orders of picking up regular-sized pallets and loading them into the truck. The non-feasible driving orders (loading larger-sized pallets) will then be assigned to one of the forklifts number one, two or three, once one of them indicates availability. By that time, the transport order (of loading the truck) will already have been partially completed.

In contrast, state-of-the-art methods would have waited for a forklift (equipped for both regular-sized and larger-sized pallets) to start processing this transport order. As a result, the pallet jack would have had idling downtime and the forklift would have to bear the entire workload, i.e., picking up and loading regular and large pallets in series. Thus, the overall productivity and utilization rate may be improved by the more fine-grained view on orders as disclosed herein.

Turning now to the figures, FIG. 1 provides a block diagram illustrating a server consistent with the embodiments and one or more terminal(s), connected to the server via a communication network. As shown in FIG. 1, a server 102 may be connected to terminal(s) 104 via communication network 103. For instance, the communication network 103 may at least partially be a wireless network, such as a WLAN (Wi-Fi) network operating on the data link layer according to the IEEE Standard 802.11 or any version thereof, such as 802.11b/g, 802.11n, 802.11ac and/or 802.11ad. Alternatively, the communication network 103 may include a mobile communication network such as a 3G/4G/5G network (UMTS, LTE, etc.). On the network and transport layers, the communication may occur via TCP/IP. The communication may occur on an application layer according to a HTTP-based protocol, such as the Simple Object Access protocol (SOAP), or Email-related protocols such as SMTP, POP3 and/or IMAP. The communication may be secured, e.g., by using encrypted WLAN (WPA, WPA2), the native security measure of a 3G/4G/5G mobile communication network, HTTPS, S/MIME and/or VPN technologies.

The server 102 and terminal(s) 104 may be equipped with network interfaces to communicate via the communication network 103, e.g., wireless network adapters for communication via a wireless network. For instance, the server 102 may be connected to multiple access points throughout the warehouse including the first site and second site, which may provide for sufficient coverage to communicate with industrial trucks in all portions of the premises. In particular the network interfaces may be equipped to send and receive "push" notifications.

The server 102 may either be located within the first or second site, in proximity thereof or remote from the warehouse. In the case of a remotely located server 102, the communication network may comprise a network link to the warehouse including the first site and/or second site. The network link of a remotely located server may be established via the Internet and/or via a virtual private network (VPN). The server 102 may be connected to multiple warehouses to control industrial trucks in each warehouse, thereby reducing costs incurred for multiple servers. The server 102 may either be a single machine or a distributed computing platform which components/nodes being distributed over various locations such as various warehouses.

In general, terminal(s) 104 may be associated to industrial truck(s). For example, each terminal may be mounted on an industrial truck. Terminal(s) 104 may provide output to operator(s) of the industrial truck(s) and receive input from the operator(s). Terminal(s) 104 may communicate with the server 102 via communication network 103. Server 102 may receive communication signals from terminal(s) 104, such as indications of availability of the industrial truck, and transmit communication signal(s) to terminal(s) 104, such as generated driving orders.

The terminal(s) 104 may include several components such as at least one processor, a user interface, a network interface, and a memory. The at least one processor may include at least one hardware-based microprocessor and a memory coupled to the at least one processor. For interface with a user, the terminal(s) 104 may include a user interface incorporating one or more user input/output devices, e.g., a keyboard, a pointing device, a display, a touch-screen display, a microphone, a speaker etc. Otherwise, data may be communicated to and from the server 102 or another computer or terminal over a network interface coupled to the communication network 103. The network interface module may be a wireless LAN (WLAN) module. The terminal(s) 104 also may be in communication with one or more mass storage devices, which may be, for example, internal hard disk storage devices, external hard disk storage devices, external databases, storage area network devices, etc.

The memory may include random access memory (RAM) providing the main operating storage of the terminal(s) 104, as well as any supplemental levels of memory, e.g., cache memories, non-volatile or backup memories (e.g., programmable or flash memories such as SD cards), read-only memories, etc. In addition, memory may be considered to include memory storage physically located elsewhere in the terminal(s) 104, e.g., any cache memory in a microprocessor, as well as any storage capacity used as a virtual memory, e.g., as stored on a mass storage device or on another computer coupled to the terminal(s) 104. The memory of the terminal(s) 104 may generally store at least information regarding at least one received driving order including, for example, source location, cargo to be transported, destination location, time of driving order receipt.

The terminal(s) 104 may typically operate under the control of an operating system and may execute or otherwise rely upon various computer software applications, components, programs, objects, modules, engines, data structures, etc., including for example, a navigation module and a location module. In general, modules may be configured to interface with the memory, the processing unit and with the server 102 via the network interface. In particular, the modules may be configured to receive "push" notifications from the server.

The navigation module may be configured to determine and output driving direction from the current terminal location to a location of interest, such as a cargo source location or a cargo destination location. The location module may be configured to determine the current location of the terminal(s) 104.

Figure 2:
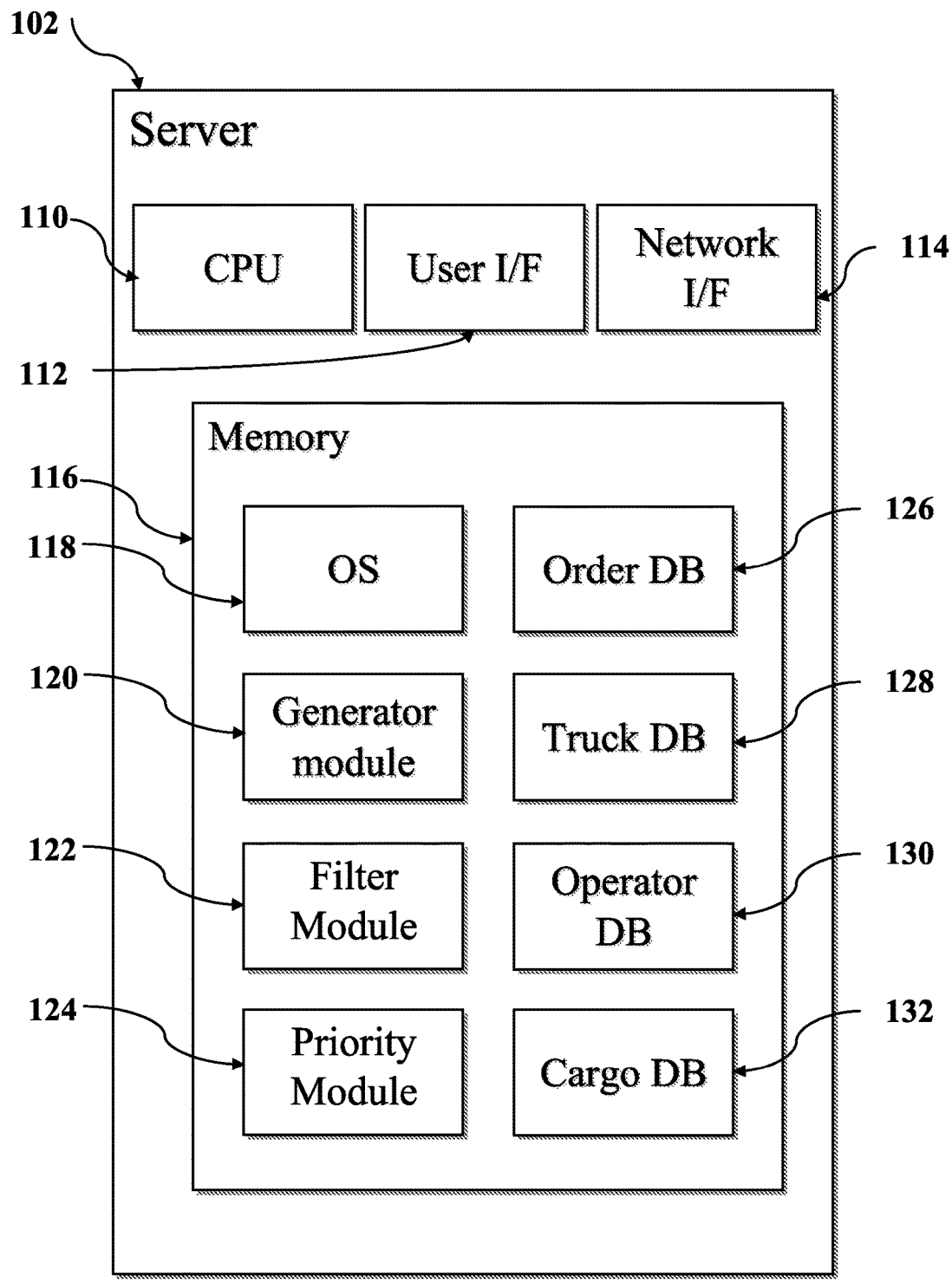
FIG. 2 is a block diagram of a server of FIG. 1

FIG. 2 provides a block diagram illustrating the components of a server consistent with the embodiments. As shown in FIG. 2, the server 102 may comprise a processor 110, a user interface 112, a network interface 114, and a memory 116.

The server 102 includes at least one processor 110 including at least one hardware-based microprocessor and a memory 116 coupled to the at least one processor 110. For interface with a user, the server 102 may include a user interface 112 incorporating one or more user input/output devices, e.g., a keyboard, a pointing device, a display, a touch-screen display, etc. Otherwise, data may be communicated to and from another computer or terminal over a network interface 114 coupled to the communication network 103. The server 102 also may be in communication with one or more mass storage devices, which may be, for example, internal hard disk storage devices, external hard disk storage devices, external databases, storage area network devices, etc.

The memory 116 may represent the random access memory (RAM) devices comprising the main storage of the server 102, as well as any supplemental levels of memory, e.g., cache memories, non-volatile or backup memories (e.g., programmable or flash memories), read-only memories, etc. In addition, memory 116 may be considered to include memory storage physically located elsewhere in the server 102, e.g., any cache memory in a microprocessor, as well as any storage capacity used as a virtual memory, e.g., as stored on a mass storage device or on another computer coupled to the server 102.

The memory 116 of the server 102 may generally store one or more databases including, for example, an order database 126, a truck database 128, an operator database 130, a cargo database 132. The databases 126-132 may comprise data and supporting data structures that store and organize the data. In particular, the databases 126-132 may be arranged with any database organization and/or structure including, but not limited to, a relational database, a hierarchical database, a network database, and/or combinations thereof. A database management system in the form of a computer software application executing as instructions on a processing unit of the server 102 may be used to access the information or data stored in records of the databases 126-132 in response to a query, where a query may be dynamically determined and executed by an operating system 118, other applications, and/or one or more modules and/or engines 120-124. For instance, the database system may be operated by using the Structured Query Language (SQL) or any variation thereof.

The server 102 typically operates under the control of an operating system 118 and executes or otherwise relies upon various computer software applications, components, programs, objects, modules, engines, data structures, etc., including for example, a generator module 120, a filter module 122 and a priority module 124. In general, modules may be configured to interface with one or more databases (e.g., an order database 126, a truck database 128, an operator database 130 or a cargo database 132) to control a plurality of industrial trucks in the warehouse.

The generator module 120 may be configured to generate a driving order by interfacing with one or more of databases 126-132, e.g., with order database 126. The filter module 122 may be configured to filter transport orders by interfacing with one or more of databases 126-132, e.g., with order database 126, truck database 128, and operator database 130. The priority module 124 may be configured to assign priorities to transport orders, by interfacing with one or more of databases 126-132, e.g., with order database 126.

In general, the order database 126 may store data concerning transport orders. For instance, data stored in the order database may include a first location indicating the origin of transport, a second location indicating the destination of transport, and a list of cargo to be transported comprising cargo items and quantities. However, it should be noted, that the quantity of cargo may also be unlimited in some cases, e.g., a constant discharging of a continuous stream of produced items (this may be realized, for example, by updating a particular transport order with new cargo to be further transported). Further, stored data concerning a transport order may include e.g., an identifier uniquely identifying the particular transport order pending at the server as well as a timestamp indicating the time of transport order reception by the server, transport unit types (e.g., pallet types), a project identifier, a customer identifier, a deadline of completion, a status of completion and driving orders hitherto generated in order to process the transport order.

The truck database 128 may store data concerning the properties of the industrial trucks operating within the warehouse. For instance, data stored in the truck database 128 may include information regarding the trucks' load capacities, their types and/or physical size, maintenance data such as the next date of service, the fuel level, the current operator, the current location, the current status of availability (idle or executing a driving order), an identifier of the current or last driving order as well as cumulative statistics such as the driving orders completed today.

The operator database 130 may store data concerning the capabilities of operators. For instance, data stored in the operator database 130 may include the experience level, the training, the working hours, the current industrial truck of each operator. Some operators may not be qualified to transport hazardous goods. Some operators may be marked as particularly strong for the case of manual lifting.

The cargo database 132 may store data concerning various type of cargo. For instance, data stored in the cargo database 132 may include the current location and the transport unit type of each piece of cargo. Some pieces of cargo may need special handling, such as hazardous materials, fragile glassware, bulky goods, refrigerated goods, goods requiring upright transport. Special handling needs may also be stored in the cargo database 132.

Figure 3:
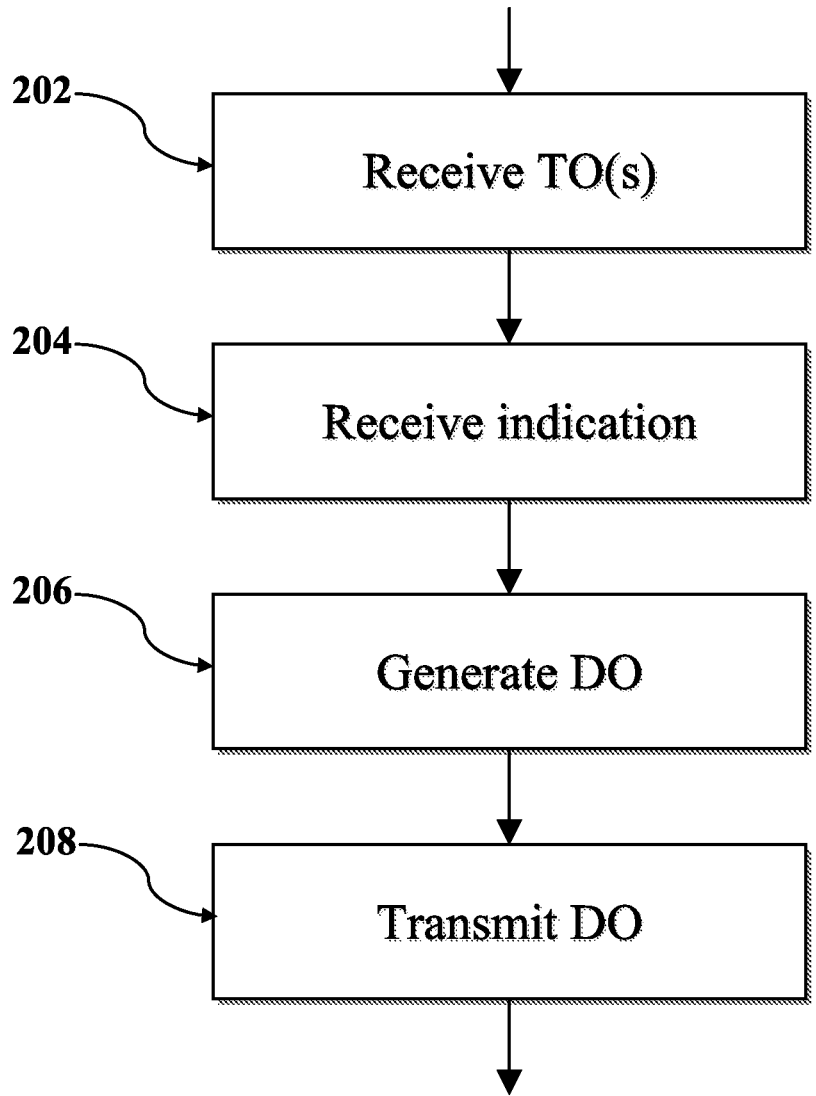
FIG. 3 is a flowchart illustrating a sequence of operations that may be performed by the server of FIG. 1 to control a plurality of industrial trucks.

FIG. 3 provides a flowchart illustrating a method consistent with the present disclosure, namely a sequence of operations that may be performed by the server 102 to control a plurality of industrial trucks operating in the warehouse. The server may receive a transport order (block 202). The transport order may specify a shipment to be transported from a first site to a second site of the warehouse. As explained above, the transport order may comprise a first site indicating the origin of transport, a second site indicating the destination of transport, and a list of cargo to be transported comprising cargo items, quantities and transport unit types. Further data in the transport order may include a project identifier, a customer identifier, a deadline of completion. The transport order may be received by the server from a computer system, such as an Enterprise Resource Planning (ERP) System. Alternatively, the transport order may be received by the server from a vehicle (such as a truck to be loaded or discharged) or from a resource site (such as a production line to be supplied with items). Transport orders may be sent and received automatically or entered manually by an operator. Sensors in the warehouse may detect certain events such as accumulation of production goods at a production line and transmit corresponding transport orders to the server 102 specifying the need to move the production goods from the production line to the stocking area of the warehouse. As another example, a supply sensor located at the production line may detect a rapid decrease in supplies and a risk of running out of supply. As a result, a corresponding shipping order may be generated by the ERP requesting the transport of further supplies from the stocking area to the production line. The shipping order may be transmitted from the ERP to the server 102 and the server 102 may generate a corresponding transport order and store the transport order in the order database 126. Other examples include the emptying of bins and emptying of a sorting station for inbound/outbound sorting.

Other examples of receiving a transport order by server 102 in form of receiving a shipping order and generating a transport order are within the scope of the present disclosure. For instance, a customer may buy a refrigerator from a mail-order company, which entails the shipping of the refrigerator from the mail-order company's distribution warehouse to the customer. As a result of the shipping order, the mail-order warehouse server may receive the order of shipping the refrigerator to the customer and therefore generates a transport order of transporting the refrigerator from the stocking area of the warehouse to a delivery truck loading dock. In this example, the shipping of the refrigerator from the warehouse to the customer is "external" to the warehouse, whereas transporting the refrigerator from the storage to the delivery truck loading dock is "internal" to the warehouse. Similarly, an external shipping order may specify a shipment to be received from a warehouse-external source, such as the supply of empty bottles to be received by the warehouse from a remote beverage warehouse.

Returning to FIG. 3, the server 102 may further receive an indication of an available industrial truck (block 204). The indication may indicate the availability of the industrial truck. For instance, the indication may be sent by the available industrial truck or by the associated terminal. Alternatively, the indication may be received by the server 102 from a navigation/location system installed within the warehouse. In general, the indication comprises a truck identifier. Additional information, such as type of industrial truck, load capacity, current operator, reason for availability may be comprised by the indication or may be retrieved by the server 102 by interfacing with one or more of databases 126-132, e.g., with truck database 128. Further, information regarding the location of the industrial truck may be included in the indication or retrieved from the navigation/location system installed within the warehouse in response to receiving the indication.

In some embodiments, the navigation/location system installed within the warehouse may provide the location of the industrial truck to the server and/or to the industrial truck itself. The location of the industrial truck provided by the location service may be included in the indication (e.g., if the truck's location is only known at the truck) and/or may be fed into a database, e.g., truck database 128. For instance, the location service may use the Global Positioning System (GPS), use another satellite-based positioning system, use Radio Frequency Identification (RFID) technology, use optical scanning of ID codes (e.g., on the warehouse floor or ceiling), use the method disclosed in U.S. Pat. No. 6,732,045 B1, or any combination thereof. Software-related implementation of the navigation/location system may be based at the terminal(s) 104, at the server 102 and/or at a third location (such as another dedicated location/navigation server).

Returning to FIG. 3, the server 102 may generate a driving order according to given criteria (block 206). As explained above, the given criteria may depend at least on properties of the available industrial truck. Properties of the available industrial truck may be contained in the received indication of the available truck or may be retrieved from the truck database 128 based on the truck identifier contained in the indication. Properties of the available industrial truck may include the load capacity, the loading pattern, the type, the size, the current operator, the current status of availability. The driving order specifies a subset of the shipment, which is within a load capacity of the available industrial truck. The driving order may be formulated as a simple GET-PUT task pair. The subset specified by the driving order may contain one or more pieces of cargo, which may be at one or more "addresses" within the first site, e.g., the warehouse. Example "addresses" may comprise storage bins, shelves, containers, production plants. In the case of multiple pieces of cargo, these pieces of cargo may be picked up sequentially by the industrial truck and delivered in a single run. In general, the driving order may comprise information indicating the type and quantity of cargo to be transported, a first location of pick-up, and a second location of delivery. For instance, it may further comprise a request for an acceptance notice, a request for a completion notice, a deadline for completion, or information regarding the corresponding transport order. In some examples, the driving order may further comprise directions to the first location of pick-up and/or directions to the second location of delivery.

The server may transmit the generated driving order to the available industrial truck for execution (block 208). In general, the server may keep a log of communication and/or processing steps. In particular, it may log received transport orders, received indications, generated driving orders, received acknowledgements and error messages. The log entries may comprise timestamps indicative of indication reception, driving order generation, transmission and completion. The log entries may comprise identifiers of the cargo, the industrial truck, the source location and the destination location. The log entries may be analyzed to assess the performance of the warehouse and may yield valuable information for increasing the performance of the warehouse. For instance, the log entries may serve to identify items with long access time, items with high access frequency, popular routes though the warehouse, efficient operators, etc. The log entries may be updated upon indication reception, driving order generation, driving order transmission, driving order completion, error events, or any combination thereof. The log may be kept by the server 102 in a log file or log database or by a dedicated log server. Alternatively or in addition, logs may be kept by individual terminals.

Figure 4:
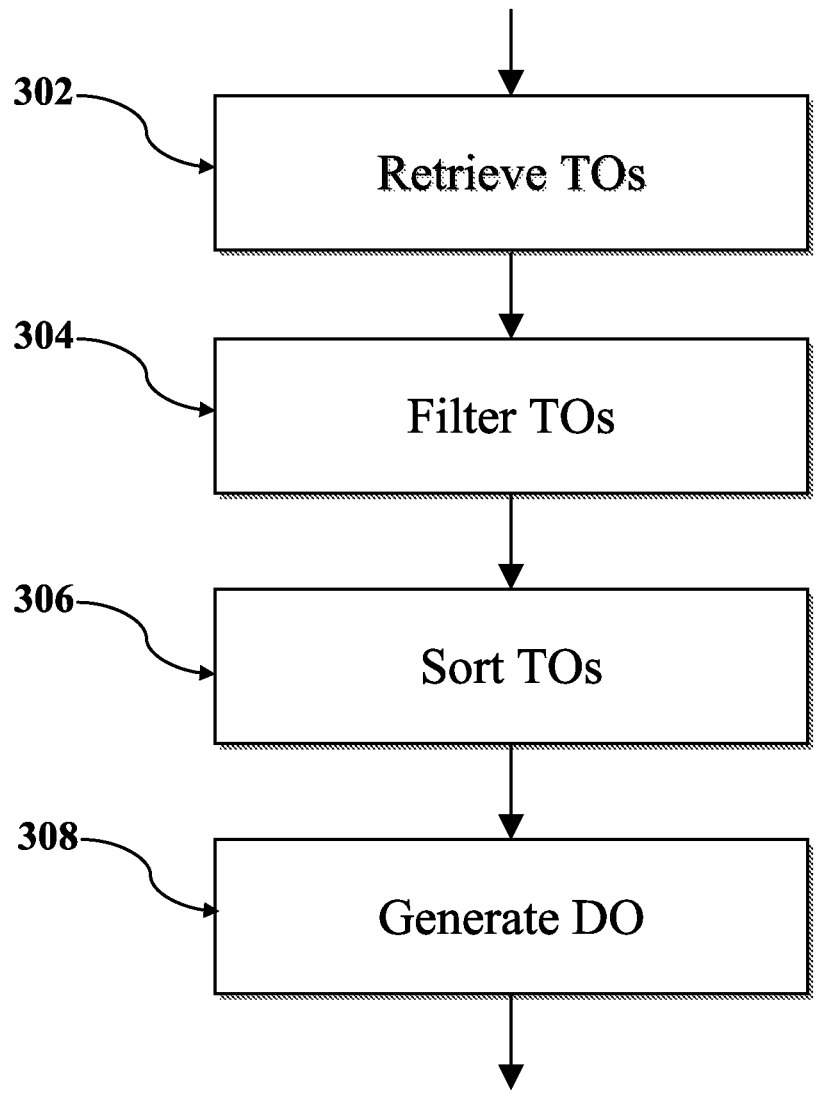
FIG. 4 is a flowchart illustrating a sequence of operations that may be performed by the server of FIG. 1 to generate a driving order.

FIG. 4 provides a flowchart that illustrates a sequence of operations that may be performed by the server 102 to generate a driving order. Typically, this sequence may be performed after reception of one or more transport order(s) and may be triggered by a reception of an indication that one of the plurality of industrial trucks is available or has become available for execution of a new driving order. The server may have stored the transport order(s), e.g., in an order database 126. The server 102 may retrieve transport orders, e.g., from the order database (block 302). The server may filter the transport orders according to given criteria (block 304). Filtering may effects an exclusion of transport orders, for example of such transport orders which include shipment being beyond the load capacity of the available industrial truck. Further filtering criteria may comprise capabilities of an operator of the available industrial truck, properties of the cargo to be driven, or properties of the first site or the second site, as will be detailed below with reference to FIG. 5. In particular, it shall be noted, that the filtering may depend on the available industrial truck, for which the indication was received by the server 102. The server 102 may further sort transport orders (block 306) by assigning priorities according to given criteria. Sorting criteria may comprise base priorities, age priorities, or utilization rate priorities, as will be detailed below with reference to FIG. 6. The driving order specifies a subset of the shipment of the most highly ranked transport order. In particular, the driving order may specify a cargo to be driven from a first location within the first site to a second location within the second site.

Figure 5:
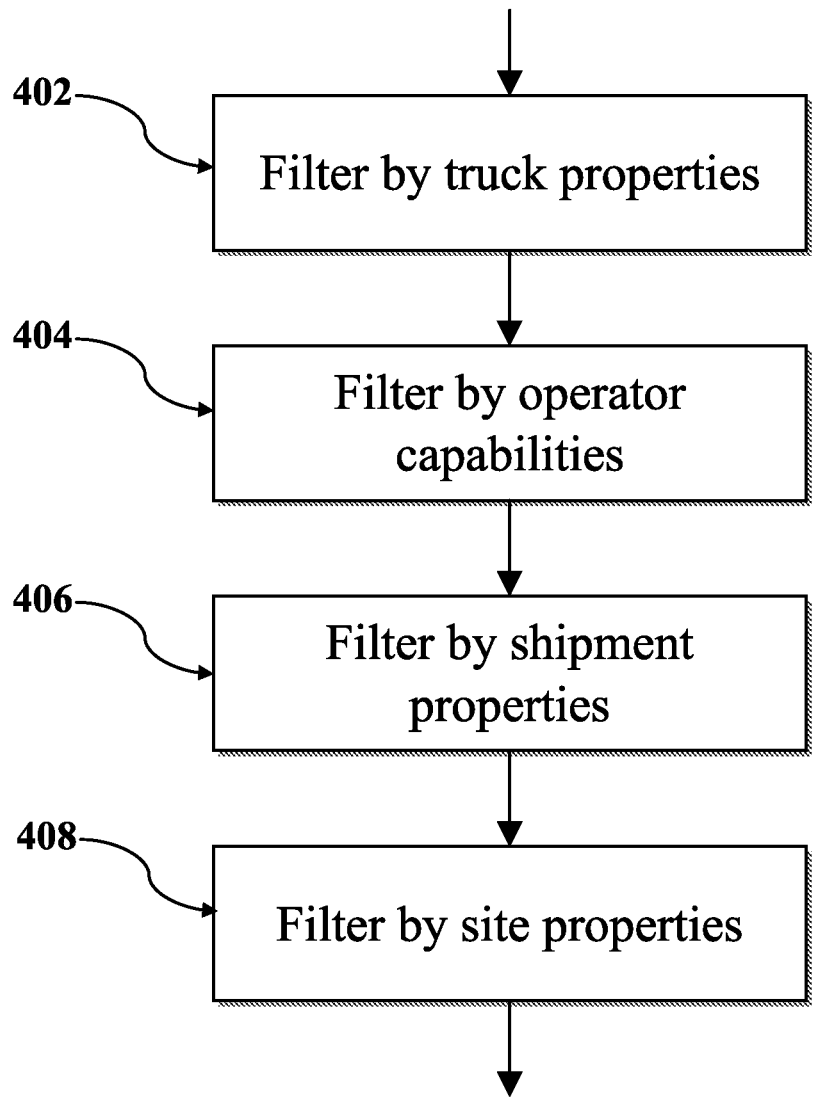
FIG. 5 is a flowchart illustrating a sequence of operations that may be performed by the server of FIG. 1 to filter transport orders.

FIG. 5 provides a flowchart that illustrates a sequence of operations that may be performed by the server 102 to filter transport orders according to given criteria depending at least on properties of the available industrial truck.

The transport orders may be filtered depending on properties of the terminal or industrial truck (block 402), for which the indication of availability was received by the server. As explained above, filtering may depend on a size of the available industrial truck, or a load capacity of the industrial truck. In particular, transport orders of large cargo may be beyond the loading capacity of a small industrial truck. These transport orders may thus be excluded from further consideration. The information or data for evaluating properties of the terminal or industrial truck may be obtained by the server from one or more of databases 126-132, in particular truck database 128.

The transport orders may then be filtered depending on capabilities of an operator of the industrial truck (block 404), for which the indication was received by the server. For instance, filtering may depend on an experience level of the operator. In particular, transport orders involving unloading cargo or driving big forklifts or driving into small aisles or loading unusual transport unit formats may be excluded from further consideration if the operator of the available industrial truck is inexperienced. The information or data for evaluating capabilities of the operator may be obtained by the server from one or more of databases 126-132, in particular operator database 130.

The transport orders may then be filtered depending on properties of the shipment (block 406). For instance, filtering may depend on a transport unit format of the shipment. Particular examples of transport unit formats of various dimensions include those specified as ISO, EUR, GWA or by other standard-setting organizations. The information or data for evaluating properties of the shipment may be obtained by the server from one or more of databases 126-132, in particular order database 126 or cargo database 132.

The transport orders may then be filtered depending on properties of the first site and/or the second site (block 408). For instance, transport orders involving a portion of the warehouse with narrow aisles may be excluded from further consideration. The information or data for evaluating properties of the site(s) may be obtained by the server from one or more of databases 126-132.

At the end of the sequence of operations illustrated by FIG. 5, the list of transport orders does not contain transport orders, which cannot be carried out by the available industrial truck and are therefore disregarded in the subsequent generation of a driving order. However, the remaining transport orders may not yet have received a relative ranking which is subject of the transport order sorting described in more detail next.

Figure 6:
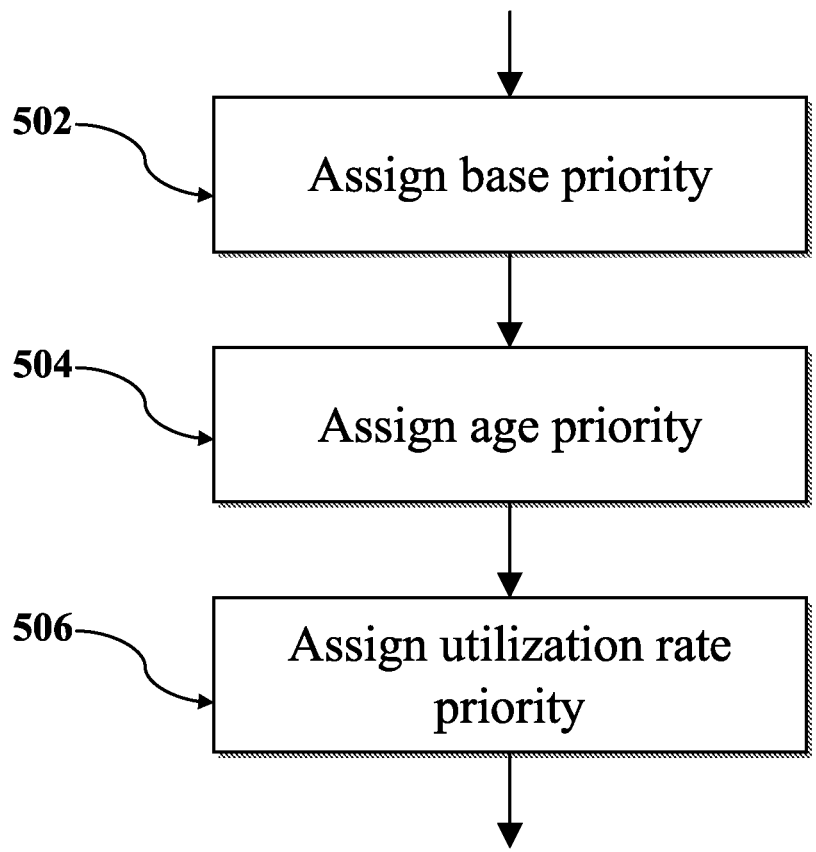
FIG. 6 is a flowchart illustrating a sequence of operations that may be performed by the server of FIG. 1 to sort transport orders.

FIG. 6 provides a flowchart that illustrates a sequence of operations that may be performed by the server 102 to sort transport orders according to given criteria. Sorting may occur according to a score system. Typically, this sequence may be performed after filtering of transport orders because transport orders excluded during the filtering activity do not need to be sorted and respective processing resources of the server 102 can be spared. Each transport order may be assigned a base priority (block 502), which may depend on the general type of the task (unloading, relocating, supplying etc.). For instance, transport orders being directed to loading of cargo from the stocking area may be more important than those involving mere relocation of cargo within the warehouse. However, transport orders being directed to loading of cargo from the stocking area may be considered to be less important than transport orders which are directed to emptying the production output (because the buffer capacities at the production output may be limited and a filled-up buffer may cause an interruption of the production). The information or data for evaluating base priorities may be obtained by the server from one or more of databases 126-132, in particular order database 126.

Each transport order may be assigned an age priority (block 504), which depends on the time since the reception of the transport order by the server 102 and thus indicates the time since the transport order has become pending at the server 102. For instance, older transport orders may be considered to be more important than younger ones. The age priority may be implemented as a linear, quadratic or exponential function of time. The information or data for evaluating age priorities may be obtained by the server from one or more of databases 126-132, in particular order database 126. In addition or alternatively, a deadline priority may be assigned, which depends on the remaining time until the planned or required time of completion. For instance, if supply to the production is scheduled to be consumed by 3 p.m., the transport order of bringing in new supplies may become increasingly urgent starting at 2 p.m. until reaching extreme urgency at 2:50 p.m. The deadline priority may be implemented as an exponential function of time.

Each transport order may be assigned a utilization rate priority (block 506), which depends on the time of empty industrial truck driving a corresponding driving order would entail. For instance, if the transport order would entail a long empty run of the industrial truck to the first location of cargo pick-up, then the transport order may be considered to be less important or less favorable than a transport order, the cargo of which can be picked up with minimal initial empty driving. For instance, a utilization rate priority may be implemented as a linearly or quadratically decreasing function of initial empty drive distance. Alternatively, the utilization rate priority may also take into account empty drive distances, which are likely or certain to occur as a consequence of a driving order after completion given the known destination location. These empty drives may be computed with any computationally reasonable or feasible "depth", i.e., number of runs ahead. The information or data for evaluating utilization rate priorities may be obtained by the server from one or more of databases 126-132, in particular truck database 126, and may comprise information about the current location of the industrial truck.

At the end of the sequence of operations illustrated by FIG. 6, the transport orders may have received a relative ranking and may be sorted according to this priority ranking. From the most highly ranked transport order, a driving order may then be generated as a subset of the most highly ranked transport order in the form of a task including source location, destination location, and pallet count, wherein the pallet count is within the load capacity of the available industrial truck. In general, the pallet count will be chosen such that it corresponds to the maximum load of the available industrial truck.

Figure 7:
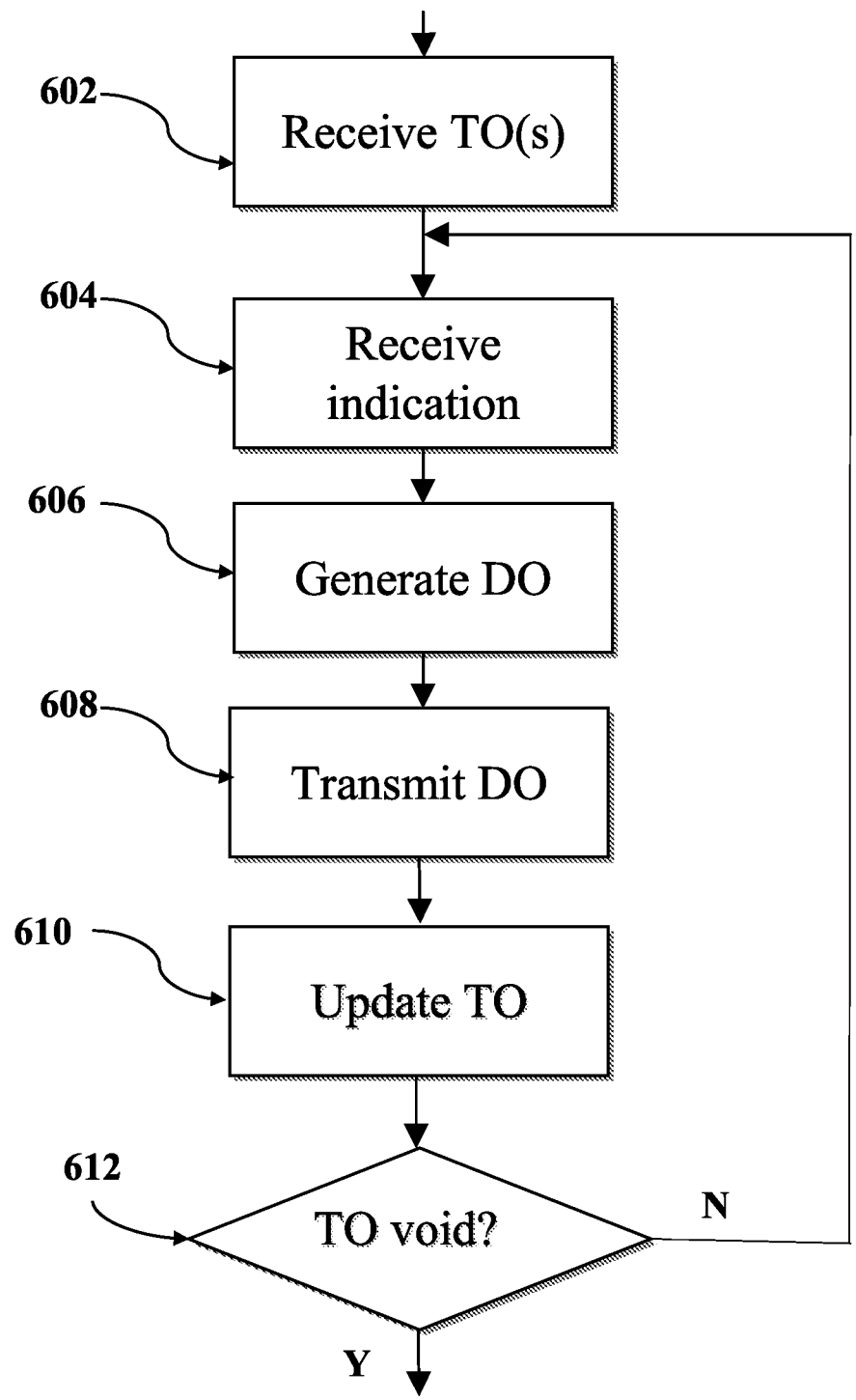
FIG. 7 is a flowchart illustrating a sequence of operations that may be performed by the server of FIG. 1 to control a plurality of industrial trucks.

FIG. 7 provides a flowchart that illustrates a sequence of operations that may be performed by the server 102 to control the plurality of industrial trucks operating in the warehouse.

Activities 602-608 may be similar or identical to those numbered 202-208 depicted and described with reference to FIG. 3. Thus, for these activities, it is referred for the respective description of blocks 202-208 above.

After transmission of the generated driving order by the server 102 to the available industrial truck (block 608), the transport order may be updated (block 610) by the server 102 by excluding the subset of the shipment specified by the generated driving order from the shipment to be transported. This may result in an updated transport order including only the remaining shipment which is not subject to the generated driving order. An update by exclusion may prevent the generation of an identical or "overlapping" driving order if further industrial truck availability indications are received by the server 102.

The updated transport order may be checked by server 102 for complete fulfillment (block 612). Complete fulfillment is achieved once the updated transport order is void. If the updated transport order is void, i.e., if it has been served completely by generation of driving orders having been executed by the industrial trucks, then the transport order may be deleted from transport order database 126 or marked as completed in the transport order database 126 and future driving orders may be generated relating to other transport orders having been received by server 102. If, on the other hand, the updated transport order is not yet void, then further driving orders may be generated on the basis of the updated transport order in response to a further indication that an industrial truck is available.

In the latter case, the server may re-iterate the steps of receiving a further indication (block 604) of another available industrial truck or the same available industrial truck, generating a further driving order (block 606) according to given criteria, wherein the further driving order specifies a further subset of the shipment specified by the updated transport order, transmitting the generated further driving order (block 608) to the other or the same available industrial truck for execution, and updating the updated transport order (block 610) by excluding the further subset of the shipment specified by the further generated driving order from the shipment specified by the updated transport order.

This re-iteration may be repeated until the updated transport order is void (block 612).

Figure 8:
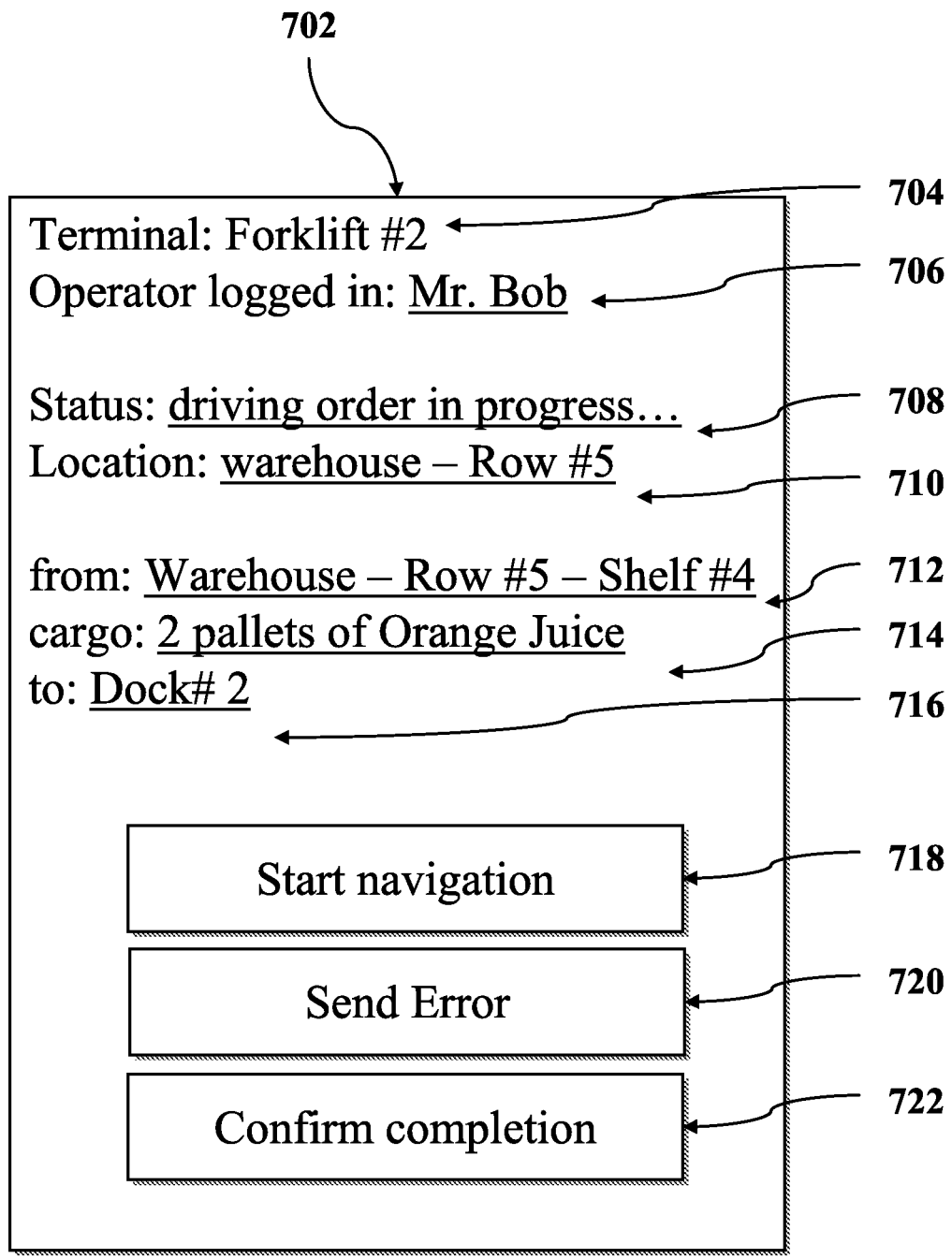
FIG. 8 is a diagrammatic view of an exemplary graphical user interface that may be output on a display of a terminal of FIG. 1, which has received a driving order from the server of FIG. 1.

FIG. 8 provides a diagrammatic view of an exemplary graphical user interface that may be output on a touch-screen display 702 of a terminal 104, which has received a driving order from server 102. The display shows a variety of identifiers 704-716. The display 702 shows a truck identifier 704 and an operator identifier 706. The terminal may be in one of a variety of states. The state shown by status identifier 708 in the present case is "driving order in progress", indicating that the terminal has received a driving order to be completed. Other states may include "idle", "available", "waiting for driving order", "communicating with server", "receiving driving order", "driving order completed", or "error".

A location identifier 710 may show the current location or coordinates of the industrial truck within the warehouse as determined by the location/navigation system, as described above.

Identifiers 712-716 show the details of the driving order currently in execution. These identifiers may serve to instruct the operator. In particular, an origin identifier 712 indicates the location, where cargo is to be picked up. A cargo identifier 714 indicates the quantity and type of cargo to be picked up. A destination identifier 716 indicates the location, where cargo is to be delivered to.

Alternatively, or in addition to the output shown, a driving order may be communicated in a variety of ways, including text-to-speech audio output or navigation by graphical means (arrows etc.). In the case of autonomously driving industrial trucks, the driving order may be communicated in a format which initiates the autonomous driving operation.

Returning to FIG. 8, buttons 718-722 provide for terminal input by the operator. This input may be communicated to the server. In particular, navigation button 718 triggers a navigation system, which may indicate driving directions from the current terminal location to the origin or destination location. Error button 720 triggers the transmission of an error code to the server. The error code may be generic or may contain details about the type or error encountered by the operator. Detailed error codes may include "cargo not found at origin location", "cargo too big", "industrial truck out of service", etc. Such error code may be processed by the server 102 in an appropriate way. For example, an error code "industrial truck out of service" may cause the server 102 to flag the industrial truck as unavailable in the truck database 128 and may undo the generation of the driving order currently being assigned to the industrial truck by re-incorporating the cargo specified by the driving order to the corresponding transport order. Confirmation button 722 triggers the transmission of a confirmation code to the server 102, indicating the successful completion of the driving order by the operator. This confirmation code may be considered by the server to be the indication that the industrial truck is again available after having concluded the execution of the driving order.

Furthermore, a new driving order received by the terminal 104 may be prompted to the operator of the industrial truck for acceptance. After acceptance by the operator by pushing a button similar to buttons 718, 720, 722, the display may prompt the operator to execute the driving order and the terminal 104 may transmit a driving order acknowledgement to the server 102. Display 702 may offer further input functions to the operating such as a refusal of a driving order, placing an audio and/or video call to a supervisor and logging off from the terminal 104.

Buttons may be offered e.g., by areas on the touch-screen display, or may be formed as physical buttons in proximity to the display or placed for convenient use by the operator, e.g., on a steering wheel of the industrial truck.

Figure 9:
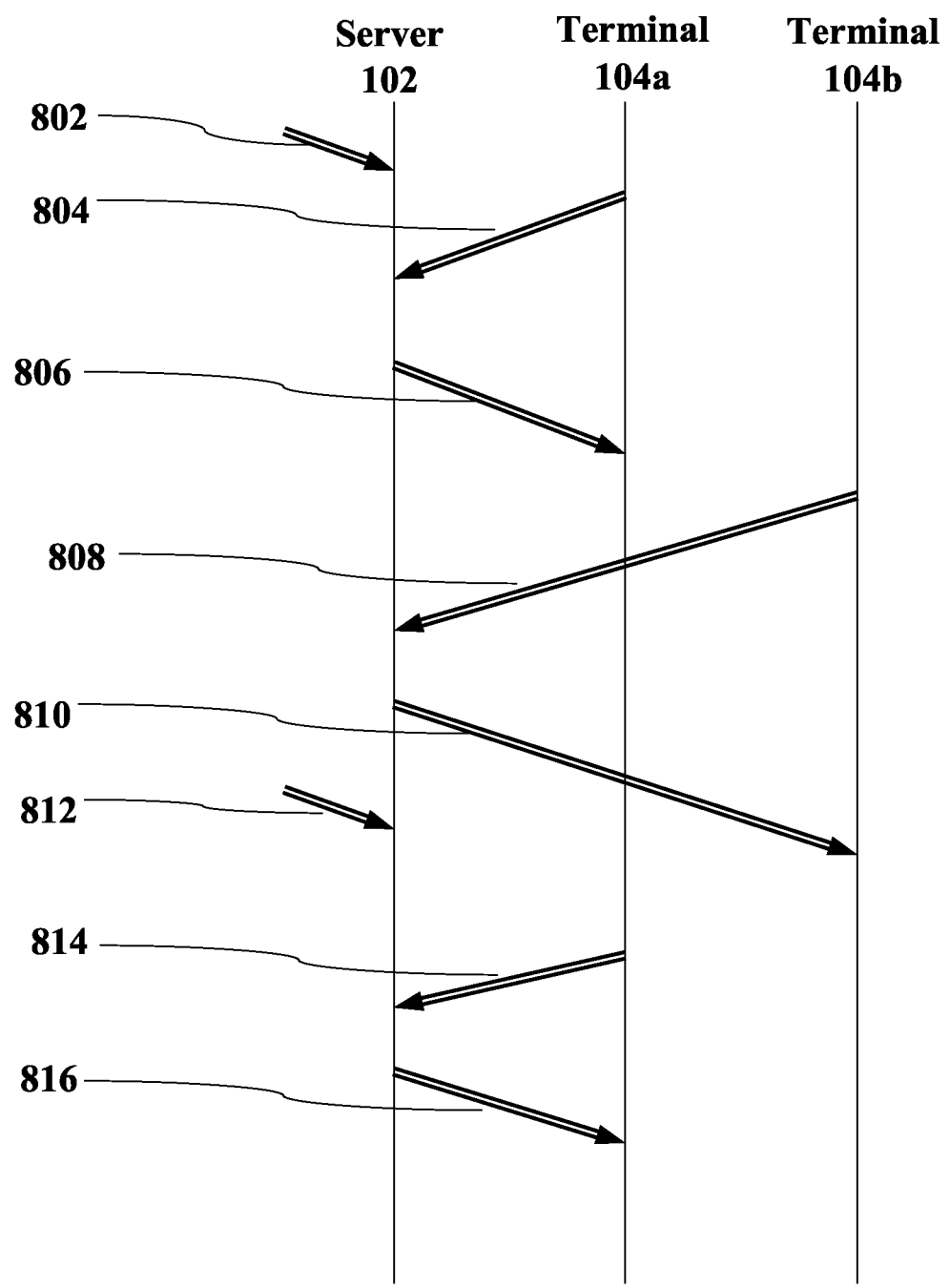
FIG. 9 is a flowchart illustrating the flow of communication between the server of FIG. 1 and two of the terminals of FIG. 1.

FIG. 9 provides a flowchart that illustrates the flow of communication between a server 102 and two terminals 104a, 104b. The example flow of communication is illustrated schematically in temporal sequence from top to bottom. Server 102 receives a first transport order (802) which specifies a first shipment. For instance, this transport order may indicate the loading of a certain number of pallets from a warehouse stocking area into a delivery truck. Terminal 104a, associated to a first industrial truck, transmits an indication (804) that the first industrial truck is available which is received by the server 102. The server 102 then generates a driving order according to given criteria. The driving order which may specify a subset of the first shipment (as the server 102 determines the first transport order to be the transport order with the highest priority among all transport orders pending at the server 102) is transmitted (806) by the server 102 and received by the first terminal 104a. Optionally, the terminal 104a acknowledges receipt of the driving order to the server 102 (not shown). The industrial truck with the first terminal 104a and its operator then execute the driving order. The industrial truck may pick up the sort and the number of pallets from the stocking area, transport them to the delivery truck and unload them into the delivery truck. In the meantime, a second terminal 104b mounted on a second industrial truck may indicate its availability by transmission of a respective indication (808). The server 102 again generates a driving order according to given criteria. The driving order, which may specify another subset of the first shipment is transmitted by the server 102 and received by the second terminal 104b (810) for execution. Optionally, the terminal 104b acknowledges receipt of the driving order to the server 102 (not shown).

At reference numeral 812, a second transport order is received by the server 102. The transport order specifies a second shipment, e.g., the storing of pallets from the production line into the stocking area. The second transport order may have a higher base priority than the first transport order. For instance, all production-related transport orders may have a higher priority to avoid newly produced cargo to "pile up" at the production line.

When the first industrial truck with terminal 104a has completed the driving order 806, the terminal 104a transmits an indication (814) signaling its availability. The server 102 again generates a driving order including filtering and sorting all pending transport orders according to given criteria, as explained in detail above. As a result of the highly prioritized second transport order, a driving order specifying a subset of the second transport order shipment may be generated and transmitted by the server 102 to the terminal 104a for completion (816) despite the remaining portions of the uncompleted first transport order (and potentially pending other transport orders). Optionally, the terminal 104a acknowledges receipt of the driving order to the server 102 (not shown).

Further processing of the pending transport orders may be conducted in a similar way by generating and assigning driving orders to industrial trucks in response to availability indications.

In general, the routines executed to implement the embodiments, whether implemented as part of an operating system or a specific application, component, program, object, module or sequence of instructions, or even a subset thereof, will be referred to herein as "computer program code," or simply "program code". Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method for controlling a plurality of industrial trucks in a warehouse, the method comprising:
    receiving, by a server, and storing in at least one database information about the plurality of industrial trucks and information about operators of the plurality of industrial trucks
    receiving, by the server, a plurality of transport orders which specify shipments to be transported between two of a plurality of sites in the warehouse, each transport order including a first site indicating an origin, a second site indicating a destination and a list of cargo to be transported
    some of the plurality of industrial trucks wirelessly transmitting availability indications to the server
    receiving wirelessly, by the server, on an ongoing basis, in response to a respective one of the industrial trucks of the plurality of industrial trucks becoming available, availability indications from the industrial trucks when they become available, each availability indication indicating that the respective industrial truck is available for executing a driving order
    upon receipt of the availability indication of a first industrial truck, generating, by the server, a first driving order from the plurality of transport orders including selecting a first transport order of the plurality of transport orders, identifying a maximum size subset of the shipment of the selected first transport order of the plurality of transport orders which is within a load capacity of the first industrial truck, and including the identified subset of the selected first transport order into the first driving order, the generating including
        discarding transport orders of the plurality of transport orders that are unsuitable based on filtering criteria
        prioritizing transport orders of the plurality of transport orders based on sorting criteria
    transmitting, by the server, the first driving order to the first industrial truck for execution
    the first industrial truck receiving the first driving order
    the first industrial truck picking up the subset of the shipment specified by the first driving order at the first site and transporting the subset of the shipment to the second site
    updating, by the server, the first transport order by excluding the identified subset of the shipment specified by the first driving order from the shipment to be transported resulting in an updated first transport order
    upon receipt of the availability indication of a second industrial truck of the plurality of industrial trucks, generating, by the server, a second driving order according to the filtering criteria depending at least on properties of the second industrial truck, wherein the second driving order specifies a further subset of the shipment specified by the updated transport order which is within a load capacity of the second industrial truck,
    transmitting, by the server, the second driving order to the second industrial truck for execution
    the second industrial truck receiving the second driving order
    the second industrial truck picking up the subset of the shipment specified by the second driving order at the first site and transporting the subset of the shipment to the second site
    updating, by the server, the updated first transport order by excluding the further subset of the shipment specified by the second driving order from the shipment specified by the updated first transport order.

2. The method of claim 1, further comprising
    receiving, by the server, a further availability indication of the first industrial truck in response to the first industrial truck having completed the execution of the first driving order,
    generating, by the server, a third driving order from the plurality of transport orders including selecting a second transport order of the plurality of transport orders, identifying a maximum size subset of the shipment of the selected second transport order of the plurality of transport orders which is within a load capacity of the first industrial truck, and including the identified subset of the selected second transport order into the third driving order, the generating including
        discarding transport orders of the plurality of transport orders that are unsuitable based on filtering criteria
        prioritizing transport orders of the plurality of transport orders based on sorting criteria
    transmitting, by the server, the third driving order to the first industrial truck for execution,
    updating, by the server, the second transport order by excluding the identified subset of the shipment specified by the third driving order from the shipment specified by the second transport order.

3. The method of claim 2, wherein receiving a further availability indication, generating a further driving order, transmitting the further driving order, and updating the updated first and second transport orders, respectively, are repeated until the updated first and second transport orders are void.

4. The method of claim 1, wherein receiving, by the server, a plurality of transport orders, which specify shipments to be transported between two of a plurality of sites in the warehouse, comprises:
    receiving, by the server from a system being external to the server, a shipping order, which specifies a shipment to be transported to a destination external to the warehouse or to be received from a source external to the warehouse,
    wherein the generating, by the server, the driving order includes generating additionally on the basis the received shipment order.

5. The method of claim 1, wherein the filtering criteria and sorting criteria are obtained by accessing the database.

6. The method of claim 1, wherein the filtering criteria depend on at least one of the following:
    capabilities of an operator of the first and second industrial trucks,
    properties of the subset of the shipment,
    properties of at least one of the first site and the second site.

7. The method of claim 1, wherein the filtering criteria depend on at least one of the following:
- a size of the first and second industrial trucks,
- the load capacity of the first and second industrial trucks,
- an experience level of the operators of the first and second industrial trucks,
- a type of a transport unit comprised by the subset of the shipment,
- a pallet format,
- a loading pattern.

8. The method of claim 1, wherein the sorting criteria depend on at least one of the following:
- a priority of the transport order,
- an age of the transport order,
- a utilization rate of the first and second industrial trucks or a utilization rate of the plurality of industrial trucks.

9. The method of claim 1, wherein the first and second driving orders specify a cargo to be driven from a first location within the first site to a second location within the second site.

10. The method of claim 1, wherein the first and second site are any one or two of the following: a production line, a warehouse stocking area, a storage facility, a distribution center, a loading station, a container, truck loading dock, a truck, a boxcar, a CEP (Courier, Express, Parcel) service, a cross dock, a port, a container port, a staging area.

11. The method of claim 1, wherein the first and second industrial trucks are one of the following: a forklift truck, a pallet jack, an automated guided vehicle, a crane.

12. The method of claim 1, wherein generating the first, second and third driving order is performed additionally on the basis of the information in the database including information concerning one or more of the following: the plurality of industrial trucks, operators of the plurality of industrial trucks, sites, shipments.

13. The method of claim 1, further comprising one or more of the following:
- receiving a driving order completion report from the first and second industrial truck, respectively,
- receiving an error message from the first and second industrial truck, respectively.

14. The method of claim 1, further comprising one or more of the following:
- receiving a signal from the first and second industrial truck, respectively, indicative of the localization of the first and second industrial truck,
- determining the localization of the first and second industrial truck,
- sending a navigation signal to the first and second industrial truck,
- monitoring the first and second industrial truck carrying out the respective first and second driving order.

15. A server for controlling a plurality of industrial trucks in a warehouse, the server comprising:
- at least one processor; and
- program code configured to be executed by the at least one processor to cause the at least one processor to
  - receive and store in at least one database information about the plurality of
- industrial trucks and information about operators of the plurality of industrial trucks receive a plurality of transport orders which specify shipments to be transported between two of a plurality of sites in the warehouse, each transport order including a first site indicating an origin, a second site indicating a destination and a list of cargo to be transported
  - receive wirelessly, on an ongoing basis, in response to a respective one of the industrial trucks of the plurality of industrial trucks becoming available, availability indications from the industrial trucks when they become available, each availability indication indicating that the respective industrial truck is available for executing a driving order
  - upon receipt of the availability indication of a first industrial truck, generate a first driving order from the plurality of transport orders including selecting a first transport order of the plurality of transport orders, identifying a maximum size subset of the shipment of the selected first transport order of the plurality of transport orders which is within a load capacity of the first industrial truck, and including the identified subset of the selected first transport order into the first driving order, including
    - discarding transport orders of the plurality of transport orders that are unsuitable based on filtering criteria
    - prioritizing transport orders of the plurality of transport orders based on sorting criteria
  - transmit the first driving order to the first industrial truck for execution causing the first industrial truck to
    - pick up the subset of the shipment specified by the first driving order at the first site and
    - transport the subset of the shipment to the second site
  - update the first transport order by excluding the identified subset of the shipment specified by the first driving order from the shipment to be transported resulting in an updated first transport order
  - upon receipt of the availability indication of a second industrial truck of the plurality of industrial trucks, generate a second driving order according to the filtering criteria depending at least on properties of the second industrial truck, wherein the second driving order specifies a further subset of the shipment specified by the updated transport order which is within a load capacity of the second industrial truck,
  - transmit the second driving order to the second industrial truck for execution causing the second industrial truck to
    - pick up the subset of the shipment specified by the second driving order at the first site and
    - transport the subset of the shipment to the second site
    - update the updated first transport order by excluding the further subset of the shipment specified by the second driving order from the shipment specified by the updated first transport order.

16. The server of claim 15, wherein the program code is further configured to, when being executed by the at least one processor, to cause the at least one processor to
- receive a further availability indication of the first industrial truck in response to the first industrial truck having completed the execution of the first driving order,
- generate a third driving order from the plurality of transport orders including selecting a second transport order of the plurality of transport orders, identifying a maximum size subset of the shipment of the selected second transport order of the plurality of transport orders which is within a load capacity of the first industrial truck, and including the identified subset of the selected second transport order into the third driving order, the generating including
  - discarding transport orders of the plurality of transport orders that are unsuitable based on filtering criteria prioritizing transport orders of the plurality of transport orders based on sorting criteria transmit the third driving order to the first industrial truck for execution, update the second transport order by excluding the identified subset of the shipment specified by the third driving order from the shipment specified by the second transport order.

17. The server of claim 16, wherein the program code is further configured to, when being executed by the at least one processor, to cause the at least one processor to repeat the activities of to receive a further availability indication, to generate a further driving order, to transmit the further driving order, and to update the updated first and second transport orders, respectively, until the updated first and second transport orders are void.

18. A computer program product comprising:

a computer readable storage medium; and program code stored on the computer readable storage medium and configured, upon execution, to cause at least one processor to receive and store in at least one database information about a plurality of industrial trucks and information about operators of the plurality of industrial trucks receive a plurality of transport orders which specify shipments to be transported between two of a plurality of sites in the warehouse, each transport order including a first site indicating an origin, a second site indicating a destination and a list of cargo to be transported receive wirelessly, on an ongoing basis, in response to a respective one of the industrial trucks of the plurality of industrial trucks becoming available, availability indications from the industrial trucks when they become available, each availability indication indicating that the respective industrial truck is available for executing a driving order upon receipt of the availability indication of a first industrial truck, generate a first driving order from the plurality of transport orders including selecting a first transport order of the plurality of transport orders, identifying a maximum size subset of the shipment of the selected first transport order of the plurality of transport orders which is within a load capacity of the first industrial truck, and including the identified subset of the selected first transport order into the first driving order, including discarding transport orders of the plurality of transport orders that are unsuitable based on filtering criteria including accessing the database prioritizing transport orders of the plurality of transport orders based on sorting criteria including accessing the database transmit the first driving order to the first industrial truck for execution causing the first industrial truck to pick up the subset of the shipment specified by the first driving order at the first site and transport the subset of the shipment to the second site update the first transport order by excluding the identified subset of the shipment specified by the first driving order from the shipment to be transported resulting in an updated first transport order upon receipt of the availability indication of a second industrial truck of the plurality of industrial trucks, generate a second driving order according to the filtering criteria depending at least on properties of the second industrial truck, wherein the second driving order specifies a further subset of the shipment specified by the updated transport order which is within a load capacity of the second industrial truck, transmit the second driving order to the second industrial truck for execution causing the second industrial truck to pick up the subset of the shipment specified by the second driving order at the first site and transport the subset of the shipment to the second site update the updated first transport order by excluding the further subset of the shipment specified by the second driving order from the shipment specified by the updated first transport order.

* * * * *